(12) United States Patent  (10) Patent No.: US 6,986,688 B1
Jansen  (45) Date of Patent: Jan. 17, 2006

(54) LOW-COST MEANS FOR ESTIMATING AND CONTROLLING SPEED OF ELECTRIC WATERCRAFT AND TROLLING MOTORS

(76) Inventor: Patrick Lee Jansen, 1 Second St., Alplaus, NY (US) 12008

( * ) Notice: Subject to any disclaimer, the term of this patent is extended or adjusted under 35 U.S.C. 154(b) by 0 days.

(21) Appl. No.: 10/860,892

(22) Filed: Jun. 3, 2004

Related U.S. Application Data

(60) Provisional application No. 60/476,727, filed on Jun. 6, 2003.

(51) Int. Cl.
*B63H 21/17* (2006.01)
(52) U.S. Cl. ............................................. 440/1; 440/6
(58) Field of Classification Search ................... 440/1, 440/2, 6; 701/21; 73/181
See application file for complete search history.

(56) References Cited

U.S. PATENT DOCUMENTS

| 4,854,902 A | 8/1989 | Havins |
| 6,276,975 B1 | 8/2001 | Knight |
| 6,659,815 B2 * | 12/2003 | Motsenbocker ................ 440/1 |

* cited by examiner

*Primary Examiner*—Andrew D. Wright

(57) ABSTRACT

A speed estimation system for watercraft comprising a propulsion unit configured to provide thrust via rotation of a propeller and having an electric motor, a power supply configured to supply electric power to the propulsion unit, and an electronic circuit configured to sense at least one propulsion system parameter from which the propeller torque can be at least implicitly determined, and at least one propulsion system parameter sensed from which the propeller speed can be at least implicitly determined, the electronic circuit configured to determine the watercraft speed based on the sensed parameters.

20 Claims, 10 Drawing Sheets

Watercraft Speed (mph) for Various
Propeller Torque (ft-lb) and Speed (RPM) Values

| RPM \ Torque | 0 | 0.5 | 1 | 1.5 | 2 | 2.5 | 3 | 3.5 | 4 | 4.5 | 5 | 5.5 | 6 | 6.5 | 7 | 7.5 | 8 | 8.5 | 9 |
|---|---|---|---|---|---|---|---|---|---|---|---|---|---|---|---|---|---|---|---|
| 0 | | | | | | | | | | | | | | | | | | | |
| 50 | 0.8 | | | | | | | | | | | | | | | | | | |
| 100 | 1.6 | | | | | | | | | | | | | | | | | | |
| 150 | 2.4 | | | | | | | | | | | | | | | | | | |
| 200 | 3.2 | | | | | | | | | | | | | | | | | | |
| 250 | 4.0 | | | | | | | | | | | | | | | | | | |
| 300 | 4.8 | | | | | | | | | | | | | | | | | | |
| 350 | 5.6 | 0.4 | | | | | | | | | | | | | | | | | |
| 400 | 6.4 | 1.2 | | | | | | | | | | | | | | | | | |
| 450 | 7.2 | 2.0 | | | | | | | | | | | | | | | | | |
| 500 | 8.0 | 2.8 | 0.7 | | | | | | | | | | | | | | | | |
| 550 | 8.8 | 3.6 | 1.5 | | | | | | | | | | | | | | | | |
| 600 | 9.6 | 4.4 | 2.3 | 0.7 | | | | | | | | | | | | | | | |
| 650 | 10.4 | 5.2 | 3.1 | 1.5 | 0.1 | | | | | | | | | | | | | | |
| 700 | 11.2 | 6.0 | 3.9 | 2.3 | 0.9 | | | | | | | | | | | | | | |
| 750 | 12.0 | 6.8 | 4.7 | 3.1 | 1.7 | 0.5 | | | | | | | | | | | | | |
| 800 | 12.8 | 7.6 | 5.5 | 3.9 | 2.5 | 1.3 | 0.2 | | | | | | | | | | | | |
| 850 | 13.6 | 8.4 | 6.3 | 4.7 | 3.3 | 2.1 | 1.0 | | | | | | | | | | | | |
| 900 | 14.4 | 9.2 | 7.1 | 5.5 | 4.1 | 2.9 | 1.8 | 0.7 | | | | | | | | | | | |
| 950 | 15.2 | 10.0 | 7.9 | 6.3 | 4.9 | 3.7 | 2.6 | 1.5 | 0.6 | | | | | | | | | | |
| 1000 | 16.0 | 10.8 | 8.7 | 7.1 | 5.7 | 4.5 | 3.4 | 2.3 | 1.4 | 0.5 | | | | | | | | | |
| 1050 | 16.8 | 11.6 | 9.5 | 7.9 | 6.5 | 5.3 | 4.2 | 3.1 | 2.2 | 1.3 | 0.5 | | | | | | | | |
| 1100 | 17.6 | 12.4 | 10.3 | 8.7 | 7.3 | 6.1 | 5.0 | 3.9 | 3.0 | 2.1 | 1.3 | 0.5 | | | | | | | |
| 1150 | 18.4 | 13.2 | 11.1 | 9.5 | 8.1 | 6.9 | 5.8 | 4.7 | 3.8 | 2.9 | 2.1 | 1.3 | 0.5 | | | | | | |
| 1200 | 19.2 | 14.0 | 11.9 | 10.3 | 8.9 | 7.7 | 6.6 | 5.5 | 4.6 | 3.7 | 2.9 | 2.1 | 1.3 | 0.6 | | | | | |
| 1250 | 20.0 | 14.8 | 12.7 | 11.1 | 9.7 | 8.5 | 7.4 | 6.3 | 5.4 | 4.5 | 3.7 | 2.9 | 2.1 | 1.4 | 0.7 | | | | |
| 1300 | 20.8 | 15.6 | 13.5 | 11.9 | 10.5 | 9.3 | 8.2 | 7.1 | 6.2 | 5.3 | 4.5 | 3.7 | 2.9 | 2.2 | 1.5 | 0.8 | 0.1 | | |
| 1350 | 21.6 | 16.4 | 14.3 | 12.7 | 11.3 | 10.1 | 9.0 | 7.9 | 7.0 | 6.1 | 5.3 | 4.5 | 3.7 | 3.0 | 2.3 | 1.6 | 0.9 | 0.3 | |
| 1400 | 22.4 | 17.2 | 15.1 | 13.5 | 12.1 | 10.9 | 9.8 | 8.7 | 7.8 | 6.9 | 6.1 | 5.3 | 4.5 | 3.8 | 3.1 | 2.4 | 1.7 | 1.1 | 0.5 |

FIG. 3

Watercraft Speed (mph) for Various Motor Voltage (volts) and Current (amperes) Values

| Voltage \ Current | 0 | 5 | 10 | 15 | 20 | 25 | 30 | 35 | 40 | 45 | 50 | 55 |
|---|---|---|---|---|---|---|---|---|---|---|---|---|
| 0 | 0.0 | | | | | | | | | | | |
| 0.5 | 1.2 | | | | | | | | | | | |
| 1.0 | 2.4 | | | | | | | | | | | |
| 1.5 | 3.6 | | | | | | | | | | | |
| 2.0 | 4.8 | | | | | | | | | | | |
| 2.5 | 6.0 | | | | | | | | | | | |
| 3.0 | 7.2 | 0.0 | | | | | | | | | | |
| 3.5 | 8.4 | 1.0 | | | | | | | | | | |
| 4.0 | 9.6 | 2.2 | | | | | | | | | | |
| 4.5 | 10.8 | 3.4 | 0.0 | | | | | | | | | |
| 5.0 | 12.0 | 4.6 | 0.1 | | | | | | | | | |
| 5.5 | 13.2 | 5.8 | 1.3 | | | | | | | | | |
| 6.0 | 14.4 | 7.0 | 2.5 | | | | | | | | | |
| 6.5 | 15.6 | 8.2 | 3.7 | 0.0 | | | | | | | | |
| 7.0 | 16.8 | 9.4 | 4.9 | 0.9 | | | | | | | | |
| 7.5 | 18.0 | 10.6 | 6.1 | 2.1 | | | | | | | | |
| 8.0 | 19.2 | 11.8 | 7.3 | 3.3 | 0.0 | | | | | | | |
| 8.5 | 20.4 | 13.0 | 8.5 | 4.5 | 0.8 | | | | | | | |
| 9.0 | | 14.2 | 9.7 | 5.7 | 2.0 | | | | | | | |
| 9.5 | | 15.4 | 10.9 | 6.9 | 3.2 | 0.0 | | | | | | |
| 10.0 | | 16.6 | 12.1 | 8.1 | 4.4 | 0.8 | | | | | | |
| 10.5 | | 17.8 | 13.3 | 9.3 | 5.6 | 2.0 | | | | | | |
| 11.0 | | 19.0 | 14.5 | 10.5 | 6.8 | 3.2 | 0.0 | | | | | |
| 11.5 | | 20.2 | 15.7 | 11.7 | 8.0 | 4.4 | 0.9 | | | | | |
| 12.0 | | | 16.9 | 12.9 | 9.2 | 5.6 | 2.1 | | | | | |
| 12.5 | | | 18.1 | 14.1 | 10.4 | 6.8 | 3.3 | 0.0 | | | | |
| 13.0 | | | 19.3 | 15.3 | 11.6 | 8.0 | 4.5 | 1.1 | | | | |
| 13.5 | | | 20.5 | 16.5 | 12.8 | 9.2 | 5.7 | 2.3 | 0.0 | | | |
| 14.0 | | | | 17.7 | 14.0 | 10.4 | 6.9 | 3.5 | 0.2 | | | |
| 14.5 | | | | 18.9 | 15.2 | 11.6 | 8.1 | 4.7 | 1.4 | | | |
| 15.0 | | | | 20.1 | 16.4 | 12.8 | 9.3 | 5.9 | 2.6 | 0.0 | | |
| 15.5 | | | | | 17.6 | 14.0 | 10.5 | 7.1 | 3.8 | 0.6 | | |
| 16.0 | | | | | 18.8 | 15.2 | 11.7 | 8.3 | 5.0 | 1.8 | 0.0 | |
| 16.5 | | | | | 20.0 | 16.4 | 12.9 | 9.5 | 6.2 | 3.0 | 0.0 | |
| 17.0 | | | | | | 17.6 | 14.1 | 10.7 | 7.4 | 4.2 | 0.9 | |
| 17.5 | | | | | | 18.8 | 15.3 | 11.9 | 8.6 | 5.4 | 2.1 | 0.0 |
| 18.0 | | | | | | 20.0 | 16.5 | 13.1 | 9.8 | 6.6 | 3.3 | 0.2 |

| Measured Motor Parameters | | |
|---|---|---|
| Armature Resistance, Ra, at test start | 0.095 | ohms |
| Armature Resistance, Ra, at completion | 0.105 | ohms |
| Armature Resistance, Ra, average | 0.100 | ohms |
| Voltage Constant, KT | 0.006667 | V/RPM |

| Fitted Propeller Parameters | | |
|---|---|---|
| Propeller Depth | 16 | inches |
| Propeller constant, K0 | 2.49 | ft-lb/kRPM^2 |
| Propeller constant, K2 | 0.014 | MPH/RPM |

| Test Condition | Measured | | | Calculated | | | Speed Difference Squared (mph) |
|---|---|---|---|---|---|---|---|
| | Boat Speed (mph) | Motor Voltage (V) | Current (A) | Motor Speed (RPM) | Torque (ft-lb) | Boat Speed (mph) | |
| Standstill | 0.00 | 2.32 | 5.00 | 273 | 0.236 | -0.48 | 0.235 |
| | 0.00 | 4.22 | 11.40 | 462 | 0.538 | -0.04 | 0.001 |
| | 0.00 | 5.50 | 16.92 | 571 | 0.798 | 0.07 | 0.005 |
| | 0.00 | 9.62 | 38.40 | 867 | 1.811 | 0.20 | 0.040 |
| | 0.00 | 10.88 | 45.60 | 945 | 2.150 | 0.22 | 0.048 |
| Light Displacement | 0.55 | 3.19 | 6.60 | 380 | 0.311 | 0.36 | 0.035 |
| | 1.43 | 5.61 | 14.80 | 620 | 0.698 | 1.26 | 0.029 |
| | 1.65 | 5.62 | 14.12 | 631 | 0.666 | 1.59 | 0.003 |
| | 2.20 | 6.73 | 18.36 | 734 | 0.866 | 2.02 | 0.033 |
| | 2.31 | 8.11 | 23.60 | 863 | 1.113 | 2.71 | 0.160 |
| | 3.63 | 9.92 | 31.12 | 1021 | 1.468 | 3.54 | 0.008 |
| | 3.96 | 11.50 | 39.60 | 1131 | 1.867 | 3.70 | 0.066 |
| | 4.40 | 13.30 | 47.96 | 1276 | 2.262 | 4.51 | 0.011 |
| Heavy Displacement | 1.32 | 3.62 | 6.84 | 440 | 0.323 | 1.12 | 0.038 |
| | 1.98 | 4.65 | 9.60 | 554 | 0.453 | 1.78 | 0.042 |
| | 2.86 | 6.88 | 16.80 | 780 | 0.792 | 3.02 | 0.025 |
| | 3.74 | 8.46 | 22.64 | 929 | 1.068 | 3.84 | 0.009 |
| | 4.13 | 9.11 | 25.20 | 989 | 1.188 | 4.16 | 0.001 |
| | 4.68 | 10.14 | 29.60 | 1077 | 1.396 | 4.59 | 0.008 |
| | 5.23 | 11.85 | 37.72 | 1212 | 1.779 | 5.12 | 0.011 |
| | 5.28 | 12.20 | 38.96 | 1246 | 1.837 | 5.40 | 0.015 |
| | | | | | | Squared Error Sum | 0.824 |

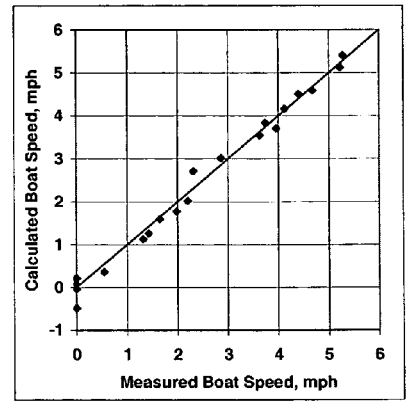

FIG. 10

LOW-COST MEANS FOR ESTIMATING AND CONTROLLING SPEED OF ELECTRIC WATERCRAFT AND TROLLING MOTORS

CROSS-REFERENCE TO RELATED APPLICATION

This application claims the benefit of Provisional Patent Application Ser. No. 60/476,727 filed Jun. 6, 2003, "Method and Apparatus for Estimating and Controlling the Speed of Electrically Propelled Watercraft".

FEDERALLY SPONSORED RESEARCH

Not Applicable

SEQUENCE LISTING OR PROGRAM

Not Applicable

BACKGROUND-FIELD OF INVENTION

The present invention relates to systems for estimating and controlling the speed of small recreational watercraft, particularly watercraft with electric motor propulsion and fixed pitch propellers, including electric trolling motors attached to watercraft.

BACKGROUND-DESCRIPTION OF PRIOR ART

As similar to an automobile speedometer, the means of providing a speed measurement for recreational watercraft is desirable for numerous purposes including adherence to speed restrictions for safety and legal reasons, boat speed control as in U.S. Pat. No. 4,854,902, gauging distance traveled, estimating distance that can yet be traveled at a current speed setting and energy reserve, and also as general information for the watercraft pilot and occupants.

The prior art in watercraft speed measurement includes paddle-wheel type transducers, sonar transducers, thin film transducers, and drag line sensors. These sensors provide a speed estimate that is relative to the waterspeed. Such sensors are adequate for most larger recreational watercraft, though reliability due to fouling and wire connection failures has been problematic to varying extents. Furthermore, placement of these sensors can be critical to the accuracy, resulting in reduced watercraft and watercraft hull design flexibility and increased wiring. Global Position System (GPS) receivers that provide absolute speed and position information are becoming increasingly common as the technology improves and cost has reduced. However, for low-cost recreational watercraft and electric trolling motors, the total installed costs of these sensors of the prior art can be too expensive. A low-cost reliable sensor suitable for low-cost recreational watercraft, especially watercraft with electric motor propulsion, that does not require additional wiring or place restrictions on the hull design is thus desirable.

Electric trolling motors are commonly used for propelling watercraft at slow speeds during fishing, and for low-speed recreational watercraft, and for power assist to small sailboats and human-powered (e.g., pedal-powered) watercraft or watercycles. Available trolling motors do not provide the operator an indication of the watercraft speed. Such a speed indication would be valuable to operators also for the above stated reasons. Currently, electric trolling motors typically range in price from $100 to $800. The additional cost of a conventional watercraft speed sensor or GPS receiver would be cost prohibitive. These trolling motors are typically permanent magnet (PM) brushed-DC electric motors designed for battery voltages of 12, 24 or 36 volts. Trolling motors in the medium-high price range are usually controlled by a power electronic converter to achieve "infinite" variable speed operation and increased efficiency to save battery power. Since these trolling motors already contain an electronic circuit board and some level of controller, they can be fitted with this invention with little or, in some cases, no extra cost. Trolling motors in the lowest price range are usually controlled via the switching of various external resistances in series with the motor armature windings. These trolling motors can be fitted with this invention for the low additional cost of essentially a microcontroller and an LCD display.

Furthermore, trolling motors with the capability of closed-loop watercraft speed regulation, which would necessitate a watercraft speed signal, are not available. Such trolling motors would be advantageous by offering precise repeatability during trolling or just traveling, especially during windy conditions or after changes in watercraft displacement.

OBJECTS AND ADVANTAGES

It is an object of the present invention to provide a low-cost, highly reliable, means of estimating the speed of a watercraft relative to water, particularly watercraft with electric propulsion, without a dedicated watercraft speed sensor. In one embodiment, the watercraft speed is estimated from the indirect sensing of a propulsion motor torque and speed. In another embodiment, the watercraft speed is estimated from the sensing of a propulsion motor voltage and current.

It is a further object of the present invention to provide a low-cost, highly reliable, means of regulating the speed of an electrically propelled watercraft.

It is yet a further object of the present invention to provide a low-cost, highly reliable, means of gauging the distance traveled by a watercraft with electric propulsion.

A further object of the present invention is to provide a low-cost, highly reliable, means of gauging the distance that can yet be traveled by a watercraft with electric propulsion.

It is further an object of the present invention to provide a low-cost, highly reliable, means of estimating the resulting travel speed of an electric trolling motor attached to a watercraft.

It is a further object of the present invention to provide a low-cost, highly reliable, means of regulating the travel speed of an electric trolling motor.

It is a further object of the present invention to provide a low-cost, highly reliable, means of gauging the distance traveled by a trolling motor.

A further object of the present invention is to provide a low-cost, highly reliable, means of gauging the distance that can yet be traveled by a trolling motor.

The invention is also applicable to underwater watercraft such as submersibles.

SUMMARY

This invention discloses a low-cost means for estimating the speed of watercraft with fixed pitch propellers through the use of the propeller characteristics and the estimation of the propeller shaft torque and speed. For watercraft powered by DC electric motors, the watercraft speed can be obtained via low-cost and reliable measurements of the motor terminal properties of voltage and current. The cost and reliability challenges associated with dedicated watercraft speed sensors are eliminated, especially in electric propulsion watercraft and electric trolling motors.

DESCRIPTION OF THE DRAWINGS

FIG. 3 is an example propeller characteristic look-up table listing watercraft speed in knots for a range of propeller shaft speeds in RPM and shaft torques in ft-lb.

FIG. 10 is an illustration of a spreadsheet utilized to create the propeller characteristic curves from measured test data.

Figure 1:
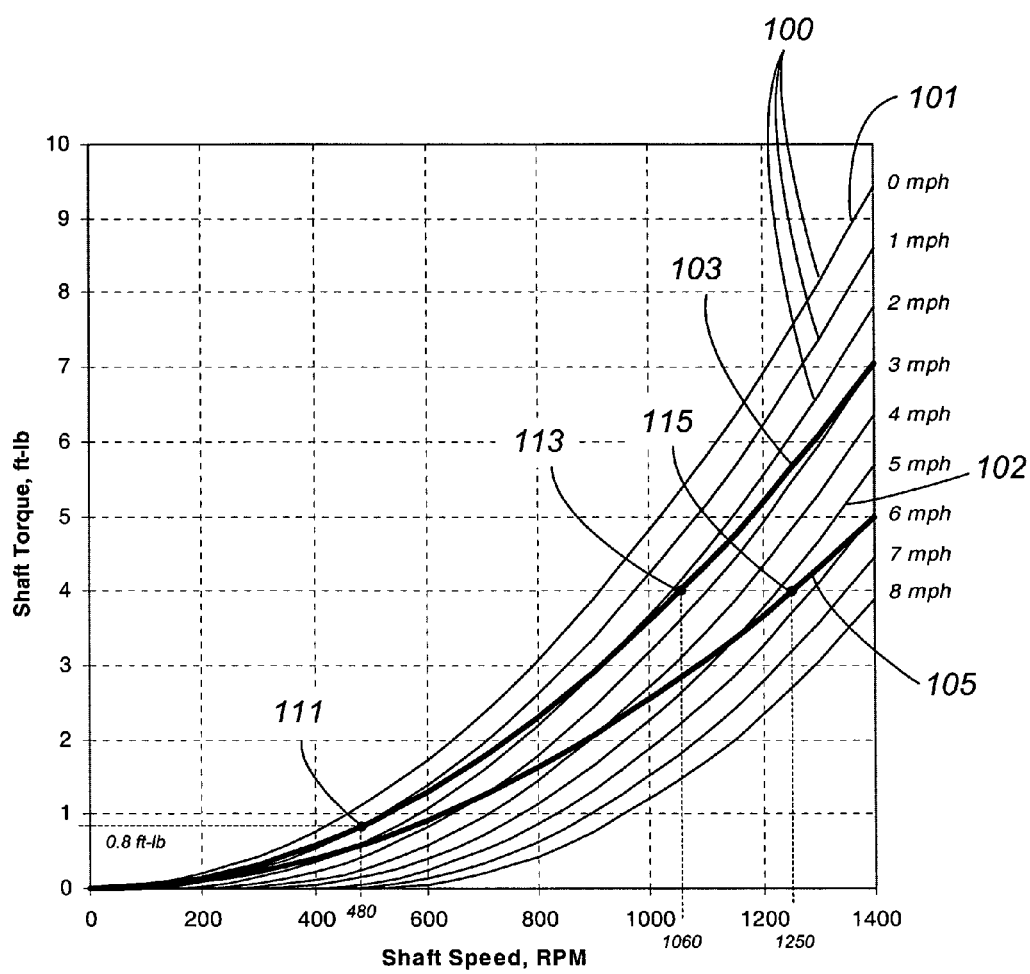
FIG. 1 is an example graph of shaft speed along the abscissa versus shaft torque along the ordinate of a propeller operating at various watercraft speeds.

REFERENCE NUMERALS IN DRAWINGS 11 propulsion system for an electric watercraft or trolling motor utilizing watercraft speed estimation invention with PM DC motor and measured terminal (i.e., armature) voltage and current 12 propulsion system for an electric watercraft or trolling motor utilizing watercraft speed estimation invention with PM DC motor and measured armature current, measured battery voltage, and estimated terminal (i.e., armature) voltage 13 propulsion system for an electric watercraft or trolling motor utilizing watercraft speed estimation invention with PM DC motor and measured armature current, measured battery voltage, and estimated terminal (i.e., armature) voltage, and direct V-I to watercraft speed estimation 14 propulsion system for an electric watercraft or trolling motor utilizing watercraft speed estimation invention with PM brushless DC motor and measured stator currents, measured battery voltage, and estimated motor speed 15 propulsion system for an electric watercraft or trolling motor utilizing watercraft speed estimation invention with PM brushless DC motor and measured stator currents, measured battery voltage, estimated motor speed, and estimated travel distance and remaining distance 16 propulsion system for an electric watercraft or trolling motor utilizing watercraft speed estimation invention with correction for varying propeller depth 17 propulsion system for an electric watercraft or trolling motor utilizing watercraft speed estimation invention with semi-automatic calibration for varying or uncertain propeller depth 18 propulsion system for an electric watercraft or trolling motor utilizing watercraft speed estimation invention with a switched resistor network to control the propulsion power.

19 user interface and/or system controller 20 microcontroller 21 watercraft speed regulator block in microcontroller utilizing estimated watercraft speed from invention; typically containing a PI regulator 22 motor/propeller shaft torque and speed calculator block in microcontroller 23 watercraft speed estimator utilizing propeller characteristic curves and receiving propeller/motor shaft torque and speed 23b watercraft speed estimator receiving propeller/motor shaft torque and speed and utilizing at least two sets of propeller characteristic curves to compensate for a range of propeller depths.

24 PWM command generation block in microcontroller receiving measured armature current, estimated terminal voltage, measured battery voltage, and voltage command signal 25 PWM command generation block in microcontroller receiving measured terminal voltage and current, and voltage command signal 26 watercraft speed estimator utilizing motor with propeller characteristic curves and receiving motor voltage and current signals 27 Commutation logic and PWM current regulator (and command generation) block in microcontroller for PM brushless DC motor receiving measured stator currents, shaft position signal(s), measured battery voltage, and current command signal 28 motor speed calculation block in microcontroller utilizing shaft position sensor signal or stator winding AC current or voltage signal from PM brushless DC motor 29 torque calculation block in microcontroller 31 battery power supply for propulsion system 33 gate driver circuits for power electronic switches 34 battery power supply voltage sensor 35 power electronic switches of a number and circuit topology consistent with the propulsion motor and controller type 36 motor terminal (i.e., armature) voltage sensor with low pass filtering 37 motor armature or stator winding current sensor 38 PM DC propulsion motor
39 propeller driven by propulsion motor
41 PM brushless-DC propulsion motor
42 motor shaft position sensor, typically consisting of Hall effect sensors
51 PM DC motor armature resistance calculator block in microcontroller utilizing measured armature temperature, typically via RTD embedded in armature windings
53 calibration block in microcontroller to compensate for an uncertain or varying propeller depth
55 user-operated switch enabling calibration for propeller depth
61 user-adjustable potentiometer for generating a desired watercraft speed signal
63 LCD displaying desired and actual watercraft speeds
65 LCD displaying desired and actual watercraft speeds, distance traveled, and remaining distance that can be traveled based upon current energy stored in battery at current watercraft speed.
71 watercraft travel distance calculation block in microcontroller utilizing estimated watercraft speed of this invention, estimated stored energy of battery, and power dissipation rate.
73 battery charge and stored energy calculation block in microcontroller utilizing measured battery voltage at no-load (zero current), and estimated motor/propeller shaft torque and speed.
100 example propeller characteristic torque vs. shaft speed curves at constant watercraft speed
101 example propeller characteristic torque vs. shaft speed curve at 0 mph
102 example propeller characteristic torque vs. shaft speed curve at 5 mph
103 example propeller torque vs. shaft speed curve for a watercraft of relatively heavy displacement operating from 0 to 3 mph
105 example propeller torque vs. shaft speed curve for a watercraft of relatively light displacement operating from 0 to 6 mph
111 example propeller torque and shaft speed for a watercraft of relatively heavy displacement operating at 1 mph
113 example propeller torque and shaft speed for a watercraft of relatively heavy displacement operating at 2.25 mph
115 example propeller torque and shaft speed for a watercraft of relatively light displacement operating at 5.5 mph
200 example DC motor characteristic voltage vs. current curves at constant watercraft speed for a given propeller
201 example motor characteristic voltage vs. current curve at 0 mph for a given propeller
202 example motor characteristic voltage vs. current curve at 5 mph for a given propeller
203 example motor voltage vs. current curve for a watercraft of relatively heavy displacement operating from 0 to 2.5 mph for a given propeller
205 example motor voltage vs. current curve for a watercraft of relatively light displacement operating from 0 to 6 mph for a given propeller
211 example motor voltage vs. current for a watercraft of relatively heavy displacement operating at 1 mph for a given propeller
213 example motor voltage vs. current for a watercraft of relatively heavy displacement operating at around 2 mph for a given propeller
215 example motor voltage vs. current for a watercraft of relatively light displacement operating at around 5.5 mph for a given propeller

DETAILED DESCRIPTION

Description and Operation

The example graph of FIG. 1 shows a sequence of thin solid lines 100 illustrating the relationship between propeller shaft speed and shaft torque for a particular propeller often used for trolling motor applications. These are the propeller characteristic curves. Each of the thin solid lines on the graph represents a constant watercraft speed relative to the water as labeled in increments of 1 mph (mile per hour). The 0 mph line 101 illustrates the shaft torque required to spin the propeller over a shaft speed range of 0 to 1400 RPM when the watercraft is stationary with respect to the water. Similarly, the 5 mph line 102 illustrates the shaft torque required to spin the propeller over a shaft speed range of 0 to 1400 RPM when the watercraft is traveling at a constant speed of 5 mph. It is important to note that the relationship between shaft torque, shaft speed, and watercraft speed illustrated by thin lines 100 are unique for each propeller design with only a minor dependency on the watercraft hull design, displacement, and depth of the propeller below the water surface.

The heavy line 103 plots the relationship between shaft torque and speed for an example watercraft with a certain displacement propelled by a trolling motor with a specific propeller, while it travels over a speed range of 0 to 3 mph. At operating point 111, the watercraft speed is 1 mph, while the shaft speed is 480 RPM and the torque is 0.8 ft-lb. At operating point 113, the watercraft speed is approximately 2.25 mph, while the shaft speed is 1060 RPM and the torque is 4 ft-lb. Heavy line 105 plots the relationship between shaft torque and speed for the same example watercraft and propeller, but with reduced displacement. At operating point 115, the torque is the same as for operating point 113 (with the heavier displacement) at 4 ft-lb, but the shaft speed is higher at 1250 RPM, and the watercraft speed is higher at 5.5 mph.

Thus with knowledge of the propeller characteristic curves 100, and the propeller shaft torque and speed, the watercraft speed relative to the water can be uniquely determined.

In the preferred embodiment, the propeller characteristic curves 100 are implemented in the form of a look-up table derived from measured test data relating propeller shaft torque and shaft speed to watercraft speed.

Alternatively, the propeller characteristic curves 100 can be implemented in the form of an approximate closed-form equation:

$$v \cong K_2 \left( \omega - \sqrt{\frac{T}{K_o}} \right)$$

where $v$ is the estimated relative watercraft speed, $\omega$ is the sensed or calculated propeller shaft speed, $T$ is the sensed or calculated propeller shaft torque, and $K_2$ and $K_o$ are constants characterizing the propeller. The constants $K_2$ and $K_o$ are preferably determined empirically via curve-fitting of measured test data. Additional accuracy can be provided via more elaborate closed-form equations, or via closed-form equations coupled with look-up tables.

The direct measurement of propeller shaft torque and speed typically requires sensors that add significant cost, size, and weight to the propulsion system. Furthermore, the sensors reduce the reliability of the system. For propulsion systems in which the propeller is driven by an electric motor, an alternative means of determining propeller shaft torque and speed is possible. Thus the preferred embodiment of this invention employs a method of indirect sensing of torque and speed utilizing the electric motor terminal properties; e.g., calculation from the sensed voltage and current for a PM brushed-DC motor and sensed current and speed or frequency for a PM brushless-DC motor.

For a brushed-DC electric motor, the steady state armature voltage is given by the equation:

$$V_a = R_a I_a + K_v \omega + V_{brush}$$

where $V_a$ is the armature voltage, $R_a$ is the armature resistance, $I_a$ is the armature current, $K_v$ is the voltage constant of the motor, $\omega$ is the motor speed, and $V_{brush}$ is the voltage drop across the commutator brushes. For a PM brushed-DC motor with only armature windings, the armature and terminal voltages are the same, and likewise, the armature and terminal currents are the same. Also both the voltage constant $K_v$ and armature resistance $R_a$ are readily known or determinable parameters that are relatively constant. The brush voltage drop, $V_{brush}$, is insignificant in many motor designs and often can be neglected, but if not, can also be readily measured and simply modeled as either a fixed voltage or a voltage value dependent upon the armature current level. Thus by sensing the PM DC motor terminal (i.e., armature) voltage and current, the motor speed (and hence, propeller shaft speed) can be indirectly determined; i.e., $$\omega = \frac{V_a - R_a I_a - V_{brush}}{K_v}$$

The shaft torque of the PM DC motor can be indirectly determined from the sensed armature current; i.e., $$T \cong K_T I_a$$

where T is the shaft torque, and $K_T$ is the torque constant of the motor. The value of the torque constant, $K_T$, of the motor is the same as the voltage constant, $K_v$, when expressed in MKS units. The shaft torque expression can be made more accurately by correcting for windage and friction losses, which are readily measured as a function of shaft speed.

Figure 2:
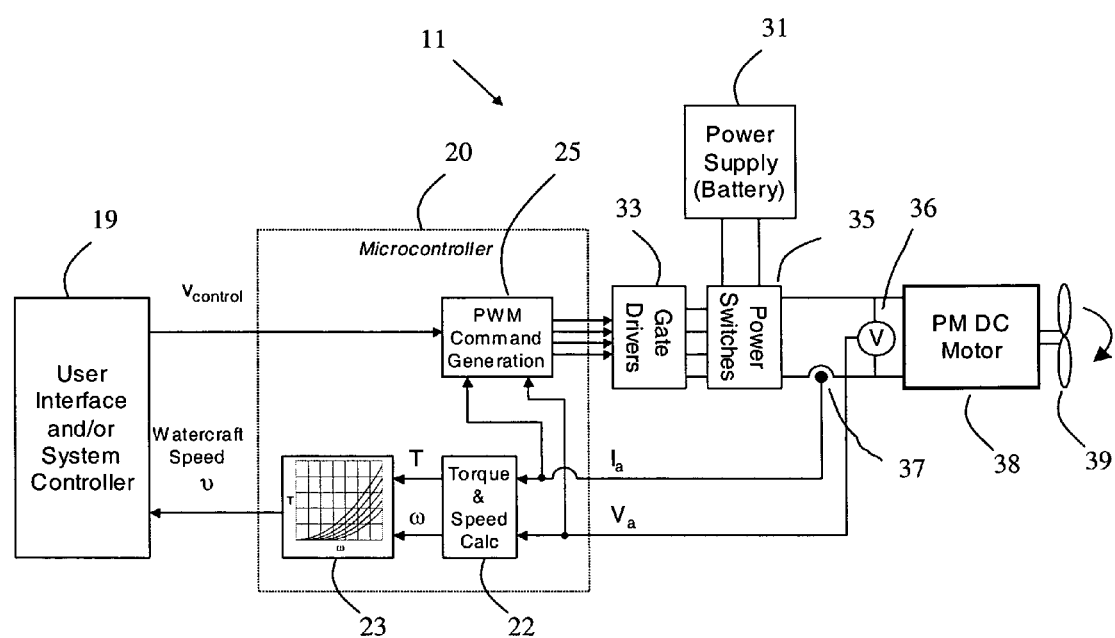
FIG. 2 is a block diagram illustration of one embodiment of the invention to estimate and control the speed of a watercraft with electric propulsion.

A basic embodiment of the invention for estimating and controlling watercraft speed using a PM brushed-DC motor is illustrated by the system apparatus 11 in FIG. 2. The system apparatus 11 contains the key propulsion system components found in both electric trolling motors and in propulsion systems for electric watercraft. A PM brushed-DC motor 38 directly drives a propeller 39. The motor terminal (i.e, armature) voltage, $V_a$, is measured via voltage sensor 36, and the motor armature current, $I_a$, is measured via current sensor 37. The measured voltage and current signals are fed to a microcontroller 20, from which the propeller shaft torque, T, and speed, $\omega$, are calculated in calculator unit 22 based upon the estimated motor resistance, $R_a$, and voltage and torque constants, $K_v$ and $K_T$, as per the above equations. The calculated shaft torque, T, and shaft speed, $\omega$, are then fed into a look-up table 23 containing the propeller characteristic curves. The output of the table 23 is the estimated relative watercraft speed, $\upsilon$, which is then fed to a user interface and/or system controller 18 for display purposes and/or watercraft speed control. Alternatively, the look-up table 23 is replaced by a closed-form expression similar to that described above that is solved within the microcontroller.

The motor 38 can be controlled via numerous methods. The preferred approach as illustrated is to utilize power electronic switches 35 in a full-bridge (H-bridge) converter topology to obtain bi-directional motor control. The power switches are typically MOSFET or IGBT semiconductor devices. Alternatively, the devices can be configured as a chopper or buck converter with relays providing bi-directional control. The power for the motor is supplied by a power supply 31, which preferably consists of one or more batteries. Alternatively, the power supply could consist of fuel cells, ultracapacitors, flywheels, or any other means of storing or generating electric power.

The user interface/system controller 18 also supplies a motor control signal, $v_{control}$, to the microcontroller 20. A PWM command generation unit 25 in the microcontroller utilizes the motor control signal, $v_{control}$, and the measured armature current and voltage signals, $I_a$ and $V_a$, to generate the power switch gate commands, which are fed to a gate driver circuit 33. The output of the gate driver circuit 33 controls the switching of the power switches 35, and thus the power flow to the motor 38. The PWM command generation unit 25 also contains all necessary motor and power electronic protection logic, including motor overcurrent protection. The voltage and current sensors, 36 and 37, also contain the necessary filtering circuitry to filter out PWM harmonics as needed. The design of such a motor controller is well known.

The look-up table 23 is stored in the microcontroller memory (e.g., EEPROM or Flash). In an example embodiment as shown in FIG. 3, the look-up table contains watercraft speed data over a range of shaft speed at increments of 50 RPM and a range of shaft torque at increments of 0.5 ft-lb. For a determined (i.e., estimated) torque and speed operating point, a watercraft speed estimate value is obtained by interpolating from the closest sets of tabulated values of shaft speed and torque. Interpolation is not required though is highly recommended to maximize accuracy. Linear interpolation is generally sufficient, though a higher order of interpolation, such as quadratic interpolation, is recommended if sufficient processing power is available without additional cost. A second table of the same form, though with different values of negative polarity, is used for operation in the reverse direction.

The microcontroller preferably contains at least three channels of A/D converters, preferably 8-bit or higher, to receive the motor terminal voltage and current signals, and the voltage control analog signal. The watercraft speed estimate output signal can be sent in the form of analog or digital signals as desired. Although a microcontroller is preferred due to low cost and the features available such as integrated memory and A/D converters, other control processors can also be utilized such as DSPs and microprocessors.

Figure 4:
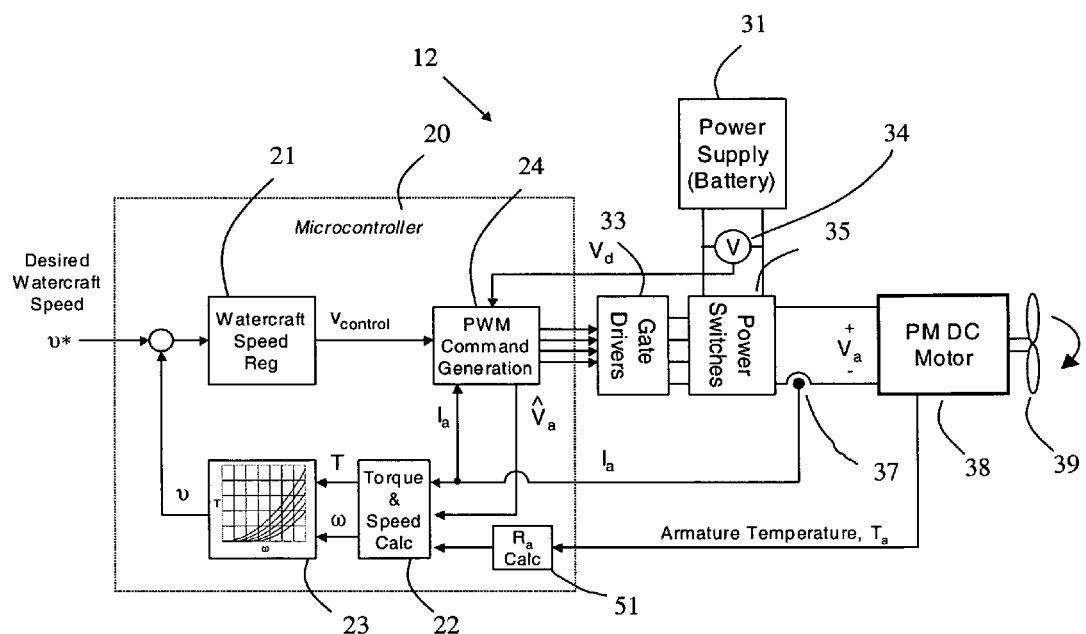
FIG. 4 is a block diagram illustration of a preferred embodiment of the invention to estimate and regulate the speed of a watercraft with electric propulsion.

FIG. 4 illustrates a second embodiment of the invention in the form of watercraft speed control system apparatus 12. The system apparatus 12 contains three modifications over the system apparatus 11. Firstly, the motor armature voltage sensor 36 is eliminated. Instead, a battery power supply voltage sensor 34 supplies a battery voltage signal, $V_d$, which is utilized by the PWM command generation unit 24. An estimate of the armature voltage, $V_a$, is calculated from the battery power supply voltage, $V_d$, and the control signal, $v_{control}$. For a full-bridge converter, the armature voltage (which is the output voltage of the converter) is related to the bus voltage by a duty ratio; i.e., $$V_a \cong (2d-1)V_d$$

where d is the duty ratio of one power switch pair in the converter. With a triangular carrier signal commonly used for PWM converters, the duty ratio is related to the control voltage by:

$$d = \frac{1}{2}\left(1 + \frac{v_{control}}{V_{tri}}\right)$$

where $V_{tri}$ is the amplitude of the triangular carrier signal. The estimated armature voltage can then be calculated from the control voltage, $v_{control}$; i.e., $$\hat{V}_a \triangleq \frac{v_{control}}{V_{tri}} V_d$$

Finite blanking time required by switch-mode converters will create a small error in the calculated armature voltage. The error is a nonlinearity that is a function of the polarity of the armature current and can be readily compensated. The advantage of this embodiment is that the cost of the armature voltage sensor 36 and necessary filtering is eliminated. Since the battery power supply voltage sensor 34 is also usually required for monitoring of the battery charge, it is usually available for use by the speed estimator at no additional cost.

The second modification in apparatus 12 is the addition of a closed-loop watercraft speed regulator 21. The estimated watercraft speed from the look-up table 23, υ, is subtracted from a desired (commanded) watercraft speed signal, υ*. The watercraft speed regulator 21 is preferably implemented as a common PI (proportional-integral) regulator with anti-windup. The output of the regulator is the PMW command control signal, $v_{control}$.

For a brushed DC motor, the accuracy of the estimated speed, ω, determined from the measured or estimated armature voltage, $V_a$, and armature current, $I_a$, is sensitive to the accuracy of the known armature resistance, $R_a$, and voltage constant, $K_v$. Both of these parameters will change slightly with changes in motor temperature. Thus if maximum accuracy is desired, motor temperature measurement and compensation of the armature resistance can be implemented via well-known methods. A common means of measuring the armature temperature is by embedding one or more RTDs in the armature windings. Thermocouples are also commonly used. One additional A/D channel of the microcontroller 20 in FIG. 4 is used to effectively measure the resistance of an embedded RTD (or sense voltage of an embedded thermocouple). Armature resistance calculation block 51 then calculates an effective armature winding temperature, $T_a$, and the armature resistance value, $R_a$, corrected for the calculated armature temperature. This resistance value is then received and utilized by the torque and speed calculation block 22.

Although the voltage constant, $K_v$, will generally change only slightly over time or operating points, a noticeable change may occur with temperature changes. The sensed armature temperature, $T_a$, can also be used to correct the voltage constant due to temperature changes. The amount of correction is dependent upon the type of permanent magnet material in the motor, and can be determined by measurement or material data. Generally, the change is modeled and corrected according to a simple linear relationship with temperature.

Note the three modifications in apparatus 12 are not mutually required, and can be implemented independent of one another. Note also that by integrating the watercraft speed estimator with an electronic motor controller as shown in FIGS. 2 and 4, the watercraft speed estimator can be implemented at little or no increased system cost or reduced reliability, since the voltage and current sensors and microcontroller are already existing.

Although not illustrated, it should be apparent that the armature current sensor 37 can optionally be replaced by a current sensor between the power supply 31 and the power switches 35 that form the converter. This sensor would measure the input bus current to the converter. The armature current can then be estimated according to:

$$\hat{I}_a \cong \eta_{conv} \frac{V_d}{V_a} I_{conv}$$

where $\eta_{conv}$ is the assumed efficiency of the converter, and $I_{conv}$ is the measured input current to the power switches (i.e., converter). Similar to the armature voltage, the armature current can be estimated from the PWM control and triangle carrier signal voltages; i.e., $$\hat{I}_a \cong \eta_{conv} \frac{V_{tri}}{v_{control}} I_{conv}$$

Thus the invention can be implemented with sensors either directly or indirectly measuring the propulsion motor terminal properties.

Figure 5:
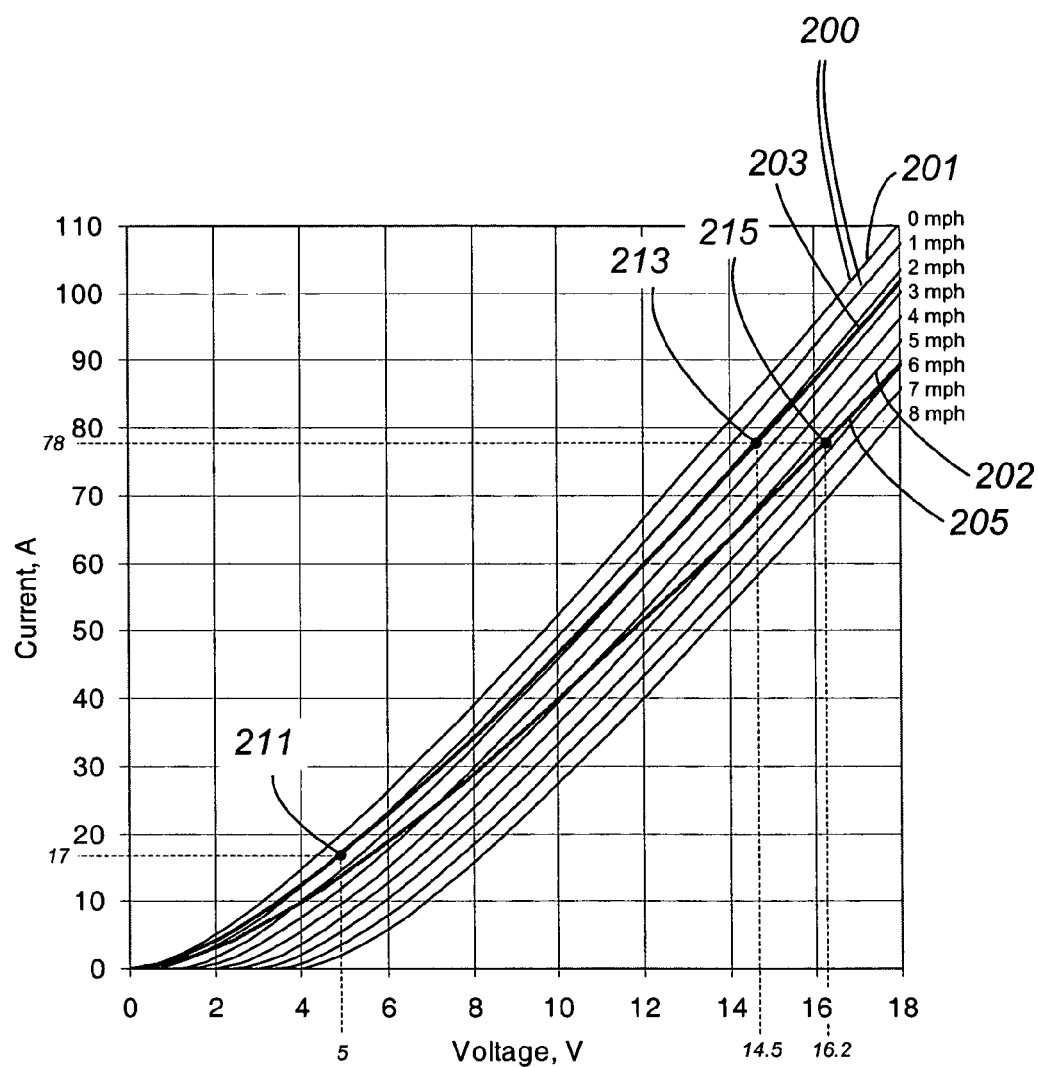
FIG. 5 is an example graph of PM DC motor voltage along the abscissa versus motor current along the ordinate of a motor driving a propeller operating at various watercraft speeds.

In another embodiment, the propeller characteristic curves are integrated with the brushed-DC motor characteristic equations, to produce a set of integrated propeller and DC motor characteristic curves. The example graph in FIG. 5 shows the integrated propeller and DC motor characteristic curves via a sequence of thin solid lines 200 that illustrate the relationship between the armature voltage and current of a particular PM DC electric motor driving a particular propeller. Each of the thin solid lines on the graph represents a constant watercraft speed relative to the water as labeled in increments of 1.0 mph. The 0 mph line 201 plots the armature current required to spin the propeller over a shaft speed range resulting from an applied armature voltage ranging from 0 to 18 volts when the watercraft is stationary with respect to the water. Similarly, the 5 mph line 202 plots the armature current required to spin the propeller over a shaft speed range resulting from an applied armature voltage ranging from 0 to 18 volts when the watercraft is traveling at a constant speed of 5 mph. It is important to note that the relationship between armature current, armature voltage, and watercraft speed illustrated by thin lines 200 are unique for each combined DC electric motor design and propeller design, with a minor dependence on the watercraft hull design, displacement, and depth of the propeller.

The line 203 plots the relationship between armature current and voltage for an example watercraft with a certain displacement propelled by a specific trolling motor with a specific propeller, while it travels over a speed range of 0 to 2.5 mph. At operating point 211, the watercraft speed is 1 mph, while the armature current and voltage are approximately 17 amperes and 5 volts, respectively. At operating point 213, the watercraft speed is approximately 2 mph, while the armature current and voltage are approximately 78 amperes and 14.5 volts, respectively. Line 205 plots the relationship for the same example watercraft and propulsion system, but with reduced displacement. At operating point 215, the armature current is the same as for operating point 213 (with the heavier displacement) at 78 amperes, but the armature voltage is higher at 16.2 volts, and the watercraft speed is higher at 5.5 mph. Thus the watercraft speed relative to the water for a specific electric motor propulsion system can also be uniquely determined with knowledge of the integrated characteristic curves 200, and the DC motor voltage and current.

Figures 6, 7:
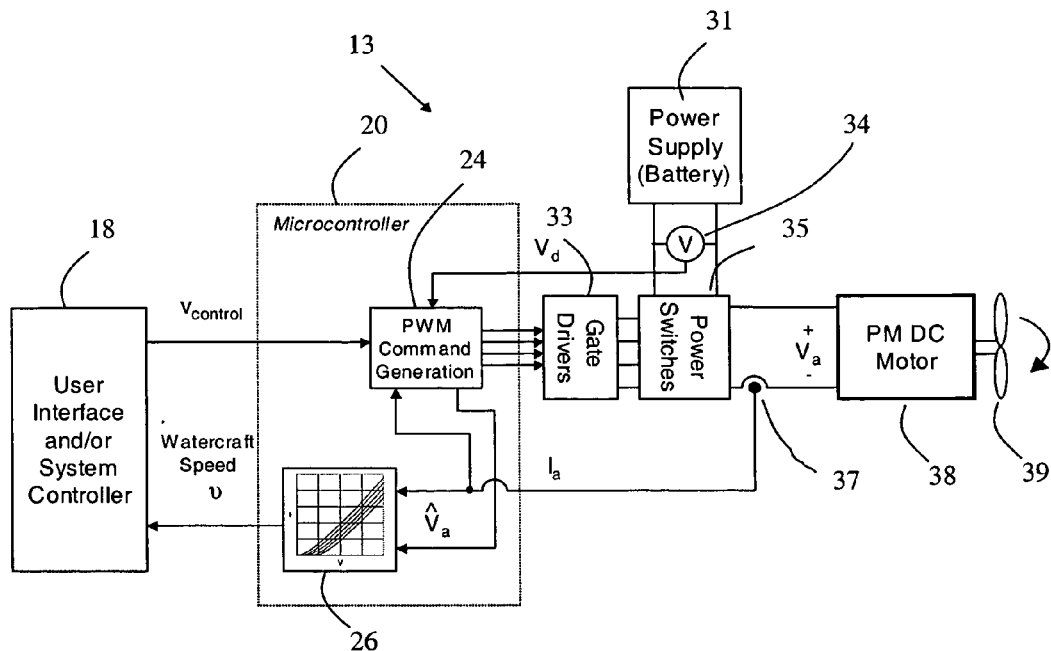
FIG. 6 is a block diagram illustration of one embodiment of the invention to estimate and control the speed of a watercraft with electric propulsion utilizing the estimated motor voltage and sensed motor current directly.
FIG. 7 is an example motor/propeller characteristic look-up table listing watercraft speed in knots for a range of DC motor voltage and current values.

FIG. 6 illustrates an apparatus 13 that utilizes the integrated DC motor and propeller characteristic curves (200) implemented in a single look-up table 26 in the microcontroller 20. The estimated armature voltage, $V_a$, and sensed armature current, $I_a$, are fed directly to the look-up table, from which the estimated watercraft speed, $\upsilon$, is directly obtained. This embodiment has the advantage of requiring less computation by the microcontroller. As with the prior embodiments, the characteristic curves can alternatively be implemented in the form of a single or a set of closed-form expressions (e.g., based upon the above motor and propeller equations), rather than a look-up table.

Like the shaft torque, T, vs. shaft speed, $\omega$, look-up table 23, the look-up table 26 of voltage vs. current is stored in the microcontroller memory (e.g., EEPROM or Flash). In an example embodiment as shown in FIG. 7, the look-up table contains watercraft speed data in mph over a range of armature voltage and current at increments of 0.5 volts and 5 amperes, respectively. For a given brushed-DC motor armature voltage and current operating point, a value is read from the look-up table using interpolation between the tabulated values. A second table of the same form, though with different values of negative polarity, is used for operation in the reverse direction.

Figure 8:
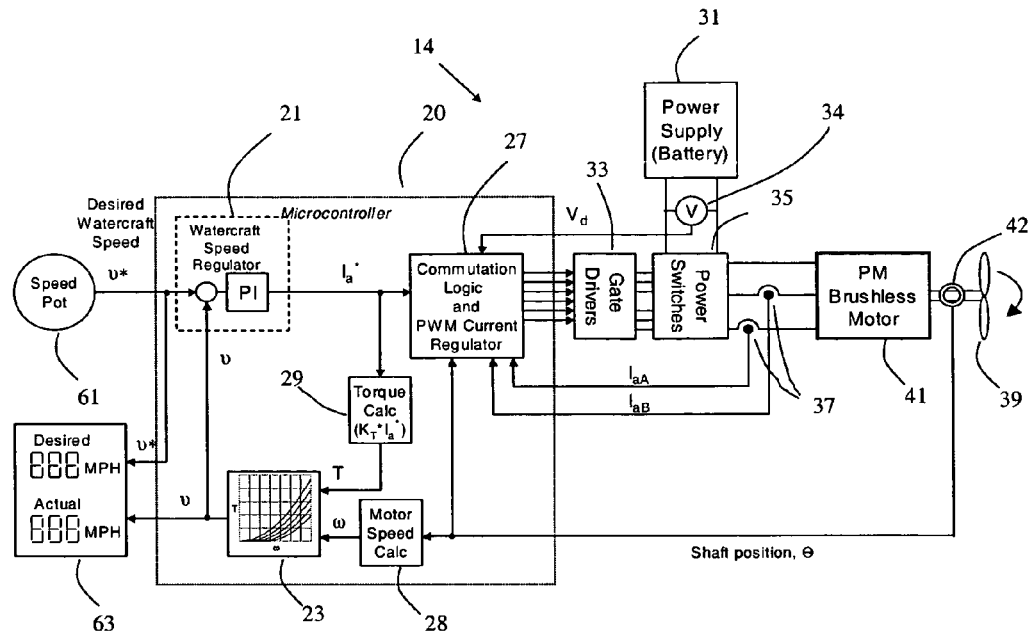
FIG. 8 is a block diagram illustration of a preferred embodiment of the invention to estimate, control, and display the speed of a watercraft with electric propulsion comprising of a brushless-DC motor and controller.

In yet another embodiment of the invention, a 3-phase brushless-PM motor is utilized instead of a PM brushed DC motor. FIG. 8 illustrates a speed regulated watercraft propulsion system 14 consisting of a current-regulated square-wave brushless-PM motor 41 and the watercraft speed estimation and regulation method of this invention. Such brushless-PM motors are also commonly referred to as current-regulated brushless-DC motors and as electronically commutated motors (ECMs). The design and control of such motors in many forms are well established in the prior art. The power electronic switches 35, totaling six in number, are configured as a three-phase inverter. Block 27 in the microcontroller 20 performs commutation and current-regulation functions by appropriate timing of the switching signals (gate signals to gate drivers block 33).

The timing of the commutation is determined by the motor rotor position, which is determined from the motor shaft position sensor 42. The position sensor commonly consists of three Hall-effect sensors mounted internal to the motor at either 120 or 60 degrees apart. The Hall-effect sensors produce one pulse per commutation. Alternatively, encoders or resolvers are also common. Sensorless control schemes, whereby a sensor 42 is not required, are also common. Such sensorless schemes typically measure the motor back-EMF signals from an unenergized winding to determine the commutation point. Such methods are well documented in published literature.

In the current-regulated brushless-DC motor, as shown in FIG. 8, the currents in preferably at least two of the motor windings are also measured via current sensors 37. The peak or RMS values of the armature (stator winding) currents, $I_{aA}$ and $I_{aB}$, are regulated to track the commanded armature (stator winding) current magnitude, $I_a^*$, via a PWM current regulator in the commutation and regulator block 27.

The commanded armature (stator winding) current, $I_a^*$, is generated by the watercraft speed regulator 21, which consists of a PI regulator in the preferred embodiment, though other types of regulators are well-known in the prior art. The watercraft speed regulator 21 receives a signal representative of a desired watercraft speed, $\upsilon^*$; the signal being set by the user via a watercraft speed potentiometer 61. The watercraft speed regulator 21 also receives a signal representative of the actual watercraft speed, $\upsilon$, which is estimated from the watercraft propeller characteristic curve look-up table 23.

The watercraft propeller characteristic curve look-up table 23 receives two signals, one representative of the torque at the propeller shaft, T, and the other representative of the propeller shaft speed, $\omega$. The propeller shaft torque, T, is calculated from the motor torque equation in the torque calculation block 29; i.e., $$T = K_T I_a^*$$

wherein $K_T$ is the torque constant of the brushless-DC motor, and $I_a^*$ is the commanded armature current. Alternatively, a signal representative of the measured armature (stator winding) currents can be utilized instead of the commanded current signal. A signal representative of the propeller shaft speed, $\omega$, is calculated in block 28 from the shaft position signal, $\theta$, obtained from the shaft position sensor 42. There are numerous well-known means of calculating the speed, $\omega$, and are dependent upon the chosen type of position sensor. In the preferred embodiment, the position sensor utilizes three Hall-effect sensors which provide signal transitions or pulses every 60 electrical degrees of rotation. In this case, the block 28 consists of either a phase-locked-loop circuit or a frequency-to-voltage converter. In an alternative embodiment, the motor speed calculation block 28 consists of either a phase-locked-loop circuit or a frequency-to-voltage converter, and receives a signal representative of one of the instantaneous measured armature currents, $I_{aA}$ or $I_{aB}$. Since the brushless-DC motor is actually one type of AC synchronous motor—the rotor is synchronous with the excitation—the instantaneous armature current of each stator winding is an AC quantity with a frequency synchronous with the rotor speed. This embodiment of block 28 is particularly useful for a sensorless implementation of the brushless-DC motor.

The desired and estimated watercraft speeds, $\upsilon^*$ and $\upsilon$, are displayed for the watercraft operator via LCD display unit 63.

Figure 9:
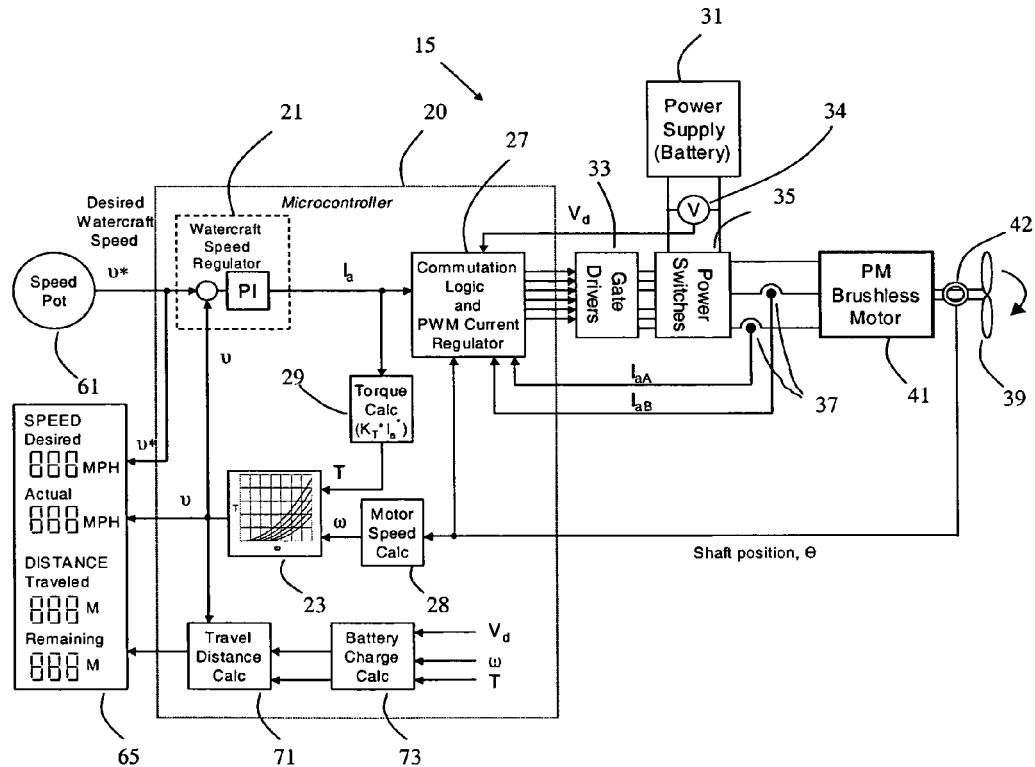
FIG. 9 is a block diagram illustration of a preferred embodiment of the invention to estimate, control, and display the speed of a watercraft, and the distance traveled and available distance remaining.

In yet another embodiment of the invention shown in FIG. 9, the estimated watercraft speed is further utilized to calculate the distance traveled and the remaining distance that can be traveled at the present speed. The battery charge calculation unit 73 in the microcontroller calculates the remaining battery charge via the measured battery voltage, $V_d$, and calculated torque, T, and motor speed, $\omega$. As with schemes found in the prior art, the current state of charge of the battery is initially calculated from the measured battery voltage, $V_d$, whenever the battery (and armature) current is zero. A look-up table is used that relates the state of charge to the no-load battery voltage. The amount of stored energy available in the battery is calculated based upon the state of charge and the assumed capacity of the battery. The battery capacity is entered into the microcontroller by the user. During running conditions, the energy used since the last no-load battery voltage measurement is calculated by integrating (i.e., summation in the microcontroller) the instantaneous power used over time. Power is calculated via the product of torque and speed, divided by assumed efficiency. The current state of charge is then estimated by subtracting the energy used from the calculated stored energy available. The stored energy calculation is updated whenever the armature (and battery) current is zero; i.e., $$E_{battery} = K_{Q_{battery}} E_{capacity} - \sum \frac{T\omega}{\eta} \Delta t$$

where $K_{Qbattery}$ is the state of charge of the battery, expressed as a fraction between 0 and 1, $E_{capacity}$ is the energy storage capacity of the total battery bank, $\eta$ is the efficiency of the power conversion process from battery output to motor output, and $\Delta t$ is the sampling time or calculation interval of the microcontroller.

The distance traveled is calculated in block 71 by integrating (i.e., summation in the digital microcontroller) the instantaneous watercraft speed over time; i.e., $$d_{traveled} = \Sigma \upsilon \Delta t$$

The remaining distance that can yet be traveled at the current watercraft speed is also calculated from the stored energy calculated; i.e., $$d_{remaining} = t_{remaining} \upsilon$$

where the remaining time available at the current speed is $$t_{remaining} = \frac{\eta E_{battery}}{T\omega}$$

Signals representative of the distance traveled and the remaining distance that can be traveled are sent to the LCD unit 65 for display.

The accuracy of the watercraft speed estimate will be dependent upon the accuracy of the propeller characteristic curves. Thus precise measurement of the curves via operation of the propeller and motor in conjunction with the actual watercraft hull under varying displacements and over an accurately measured range of watercraft speeds is recommended. With embodiments incorporating a PM brushed-DC motor, the test procedure would consist of measuring at least the watercraft speed, armature voltage, and armature current under varying displacements over the foreseeable watercraft speed range. Preferably, the measurements are performed on the same watercraft size and hull design as the invention is to be used with.

If the armature temperature is not available during the test, the motor should be operated for sufficient time to reach a steady state operating point temperature. At this point, the armature resistance should be measured and the test immediately commenced. After the test, the armature resistance should be measured again, and an average value be used for calculating the motor speed. A spreadsheet program, such as Excel, is recommended to analyze the measured data. Such a spreadsheet is illustrated in FIG. 10, which is also used to optionally calculate the closed-form characteristic curve propeller constants, $K_0$ and $K_2$ using a least-squared-errors approach.

The accuracy of the watercraft speed estimation will be sensitive to the depth of the propeller below the water surface. For maximum accuracy, the propeller should be operated at the same depth as to what the propeller characteristic curves were measured at. For watercraft with a permanently attached propulsion motor and propeller, the variation is propeller depth will be due to changes in displacement, and will generally result in only a small variation in accuracy. If the propeller characteristic curves are measured at these different displacements for the particular watercraft, then no additional compensation should be necessary to improve the accuracy of the watercraft speed estimation.

Trolling motors, however, are designed not to be permanently attached to a watercraft, and are thus designed to operate over a range of propeller depth with a wide range of watercraft sizes and designs. The particular operating depth is manually set by the user, and is not known in advance to the manufacturer. Since the manufacturer of the trolling motor, who may wish to implement this invention, has no means of knowing as to what propeller depth the users will operate the trolling motor, some means of correcting for the propeller depth must be incorporated in the invention.

Figure 11:
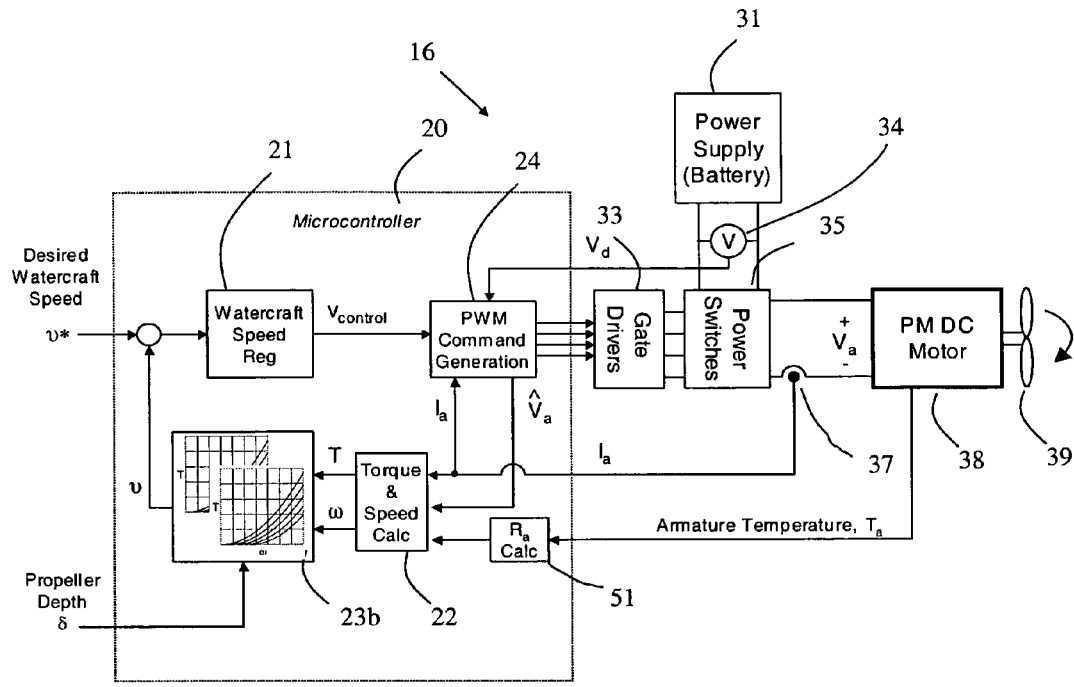
FIG. 11 is a block diagram illustration of a preferred embodiment of the invention to estimate and control the speed of a watercraft with electric propulsion with correction for a range of propeller depths.

FIG. 11 illustrates yet another embodiment (apparatus 16) wherein at least two sets of propeller characteristic curves are utilized in block 23b to estimate the watercraft speed, particularly when the propulsion system is in the form of a trolling motor. The two sets of curves are derived from test measurements taken with the propeller set to two different depths below the water surface. The trolling motor would have distance increments permanently marked on its vertical support shaft to indicate the depth of the propeller. The user determines the depth by reading the waterline relative to markings on the vertical support shaft, and then enters the value into the microcontroller. The microcontroller then calculates the estimated watercraft speed by interpolating between the at least two sets of propeller curves based upon the entered propeller depth; i.e., $$\upsilon = \left( \frac{\delta - \delta_1}{\delta_2 - \delta_1} \right) (\upsilon_2 - \upsilon_1) + \upsilon_1$$

where $\delta$ is the user-entered (or actual) propeller depth, $\upsilon_1$ is the estimated watercraft speed determined from the propeller characteristic curves corresponding to a propeller depth of $\delta_1$, and $\upsilon_2$ is the estimated watercraft speed determined from the propeller characteristic curves corresponding to a propeller depth of $\delta_2$. The equation assumes a simple linear relationship between propeller depth and estimated watercraft speed. Higher order equations, such as a quadratic relationship, can be used if at least one additional characteristic curve is measured.

Figure 12:
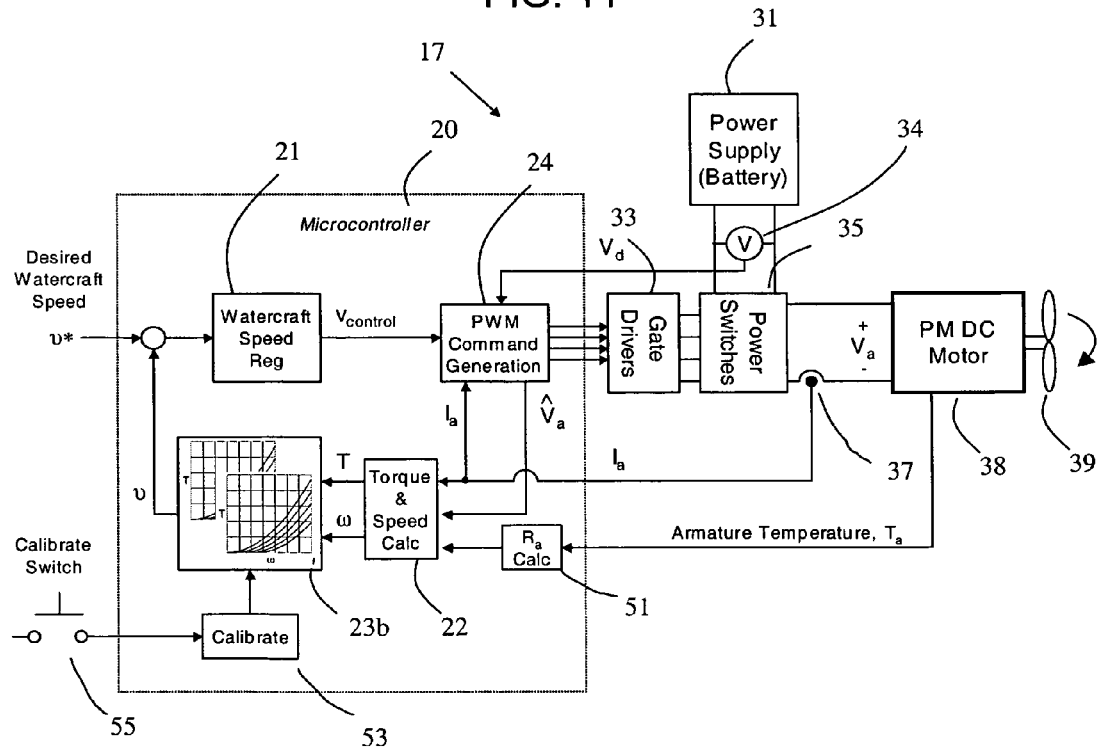
FIG. 12 is a block diagram illustration of a preferred embodiment of the invention to estimate and control the speed of a watercraft with electric propulsion with semi-automatic calibration for uncertain propeller depth.

In yet another embodiment shown in FIG. 12 (apparatus 17), a semi-automatic calibration method is used to improve accuracy, especially to account for differing propeller depths, though it also will improve accuracy with differing watercraft hull designs. When the watercraft is known to be at standstill, the user can decide to calibrate by depressing a calibration switch 55. The microcontroller will send a momentary propeller speed command to the motor controller, thereby spinning the propeller momentarily. The propeller is spun for no longer than necessary to record measurements to avoid causing the watercraft to propel forward. The propeller torque, T, and speed, ω, are determined during this momentary excitation. From the propeller characteristic curves for at least two differing propeller depths (block 23*b*), the microcontroller looks up the torque values, $T_1$ and $T_2$, measured at depths, $\delta_1$ and $\delta_2$, at the measured propeller speed, ω. The torque values are read from the 0 MPH curves. The effective depth of the propeller is then determined by the equation:

$$\delta = \left(\frac{T - T_1}{T_2 - T_1}\right)(\delta_2 - \delta_1) + \delta_1$$

During normal operation of the watercraft after this calibration or initialization process, the effective propeller depth, δ, is then used throughout to calculate an interpolated watercraft speed in the same manner as the user-entered depth in apparatus 16 of FIG. 11.

Figure 13:
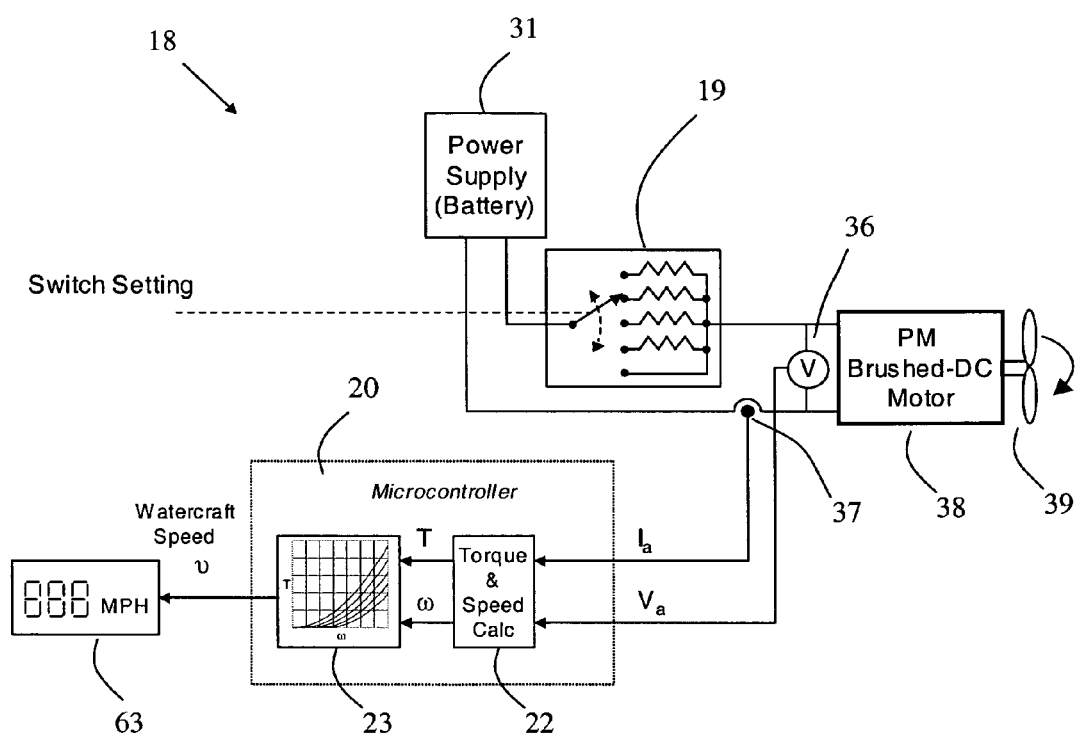
FIG. 13 is a block diagram illustration of one embodiment of the invention to estimate the speed of a watercraft with electric propulsion wherein a switched resistor network is used to control the propulsion system.

The speed estimation method of this invention is equally applicable to alternative control means that do not use power electronics, such as ones that instead utilize the switching of various resistors and/or resistor networks in series with the armature windings of a brushed-DC motor. Recall that this control method is used in the lowest cost electric trolling motors. FIG. 13 illustrates such an embodiment of this invention utilizing a switched-resistor bank 19. The watercraft speed estimator of this embodiment is then similar to that in FIG. 2, with the exception that the microcontroller and voltage and current sensors are used for speed estimation, but not directly for motor control.

While the detailed drawings, specific examples, and formulations given describe exemplary embodiments, they serve the purpose of illustration only. The configurations shown and described may differ depending upon on the chosen application and controller and propulsion motor type and implement method. The most basic parameters defining the propeller characteristic curves 100 of this invention are watercraft travel speed as a function of propeller shaft torque and shaft speed. It should be obvious that the curves can be defined in any system of units. It should also be obvious that the curves can be defined or formulated with alternative parameters derived from shaft torque and shaft speed. For example, shaft torque can be replaced by propeller shaft power, which is the product of shaft torque and shaft speed. In which case, to estimate the watercraft travel speed, the motor output power would be calculated and supplied to the alternative characteristic curves instead of calculated motor torque.

It should also become apparent that the integrated motor and propeller characteristic curves 200 can be defined or formulated with alternative parameters. For example, either armature voltage or current can be replaced by motor input power, which is the product of armature voltage and current for a DC motor. In which case, to estimate the watercraft travel speed, the motor input power would be calculated and supplied to the alternative characteristic curves along with either armature voltage or current.

The characteristic curves can even be formulated with the converter (power switches 35) included. For example, the parameters defining the curves can be the input power to the converter (i.e., $V_d * I_{conv}$) and a PWM modulation ratio (i.e., $V_{control}/V_{tri}$).

It should be now apparent that even other formulations and embodiments of this invention are possible. The key aspect is that the characteristic curves, from which the watercraft travel speed is estimated, are formulated with at least two independent parameters that can be ultimately, either directly or indirectly, linked back to the basic propeller parameters of shaft torque and shaft speed. These independent parameters are also commonly referred to as independent state variables.

The invention is also applicable to wound-field DC and AC propulsion motors such as PM AC synchronous, induction, wound-field synchronous, and motors. The motor controllers for the AC motors would typically consist of PMW inverters generally implemented with either V/Hz or field-oriented (also known as vector or torque) control methods. In field-oriented controlled systems, the estimated (i.e., controlled) motor speed and torque are readily available for use by this invention.

Furthermore, many of the fine details that would be required to fully implement the motor control and propulsion system with the invention have not be disclosed here, because such information is readily available in published literature, and is well known to those skilled in the art.

What is claimed is:

1. A speed estimation system for watercraft comprising:
 a propulsion system means comprising an electric motor and propeller configured to provide propelling thrust via rotation of the motor and propeller, the propulsion system means further configured to receive electrical power;
 an electronic circuit configured to store the characteristics of the electric motor and the propeller of the said propulsion system means,
 the electronic circuit further configured to sense at least two independent parameters of the said propulsion system, the electronic circuit configured to determine an estimated watercraft speed based on the sensed parameters and the stored characteristics of the electric motor and the propeller.

2. The speed estimation system of claim 1, wherein the propulsion system means is an electric trolling motor.

3. The speed estimation system of claim 1, wherein one of the two independent parameters is either a motor terminal voltage or the voltage of the electrical power received by the propulsion system means.

4. The speed estimation system of claim 1, wherein one of the two independent parameters is either a motor terminal current or the current of the electrical power received by the propulsion system means.

5. The method and apparatus of claim 1, wherein the stored characteristics of the electric motor and the propeller are stored in the form of either a look-up table or a mathematical function.

6. The speed estimation system of claim 1, wherein the estimated watercraft speed is utilized in a speed regulator to regulate the speed of the watercraft.

7. The speed estimation system of claim 1, further comprising a means for estimating the distance traveled utilizing the estimated watercraft speed.

8. The speed estimation system of claim 1, wherein an energy storage means is used to supply the electrical power received by the said propulsion system means, and the electronic circuit is further configured to determine the remaining available stored energy in the energy storage means, the electronic circuit further configured to utilize the determined remaining available stored energy to also determine the remaining operation time at the estimated watercraft speed.

9. The speed estimation system of claim 8, further comprising a means for estimating the remaining distance that can be traveled utilizing the estimated watercraft speed and the determined remaining available stored energy.

10. The speed estimation system of claim 1, wherein speed estimation accuracy is improved via correction for varying propeller depth.

11. A method for estimating the travel speed of watercraft and electric trolling motors comprising:
   providing an electric propulsion unit configured to provide thrust via rotation of a propeller;
   providing an electronic circuit configured to store the characteristics of the electric propulsion unit,
   sensing at least two parameters of the said propulsion unit, and
   determining an estimated travel speed based on the sensed parameters and the stored characteristics of the electric propulsion unit.

12. An electric trolling motor for watercraft comprising:
   a propulsion system means comprising an electric motor and propeller configured to provide propelling thrust via rotation of the motor and propeller, the propulsion system means further configured to receive electrical power;
   an electronic circuit configured to store the characteristics of the electric motor and the propeller of the said propulsion system means,
   the electronic circuit further configured to sense at least two independent parameters of the said propulsion system, the electronic circuit configured to determine an estimated travel speed of the electric trolling motor based on the sensed parameters and the stored characteristics of the electric motor and the propeller.

13. The electric trolling motor of claim 12, wherein one of the two independent parameters is either a motor terminal voltage or the voltage of the electrical power received by the propulsion system means.

14. The electric trolling motor of claim 12, wherein one of the two independent parameters is either a motor terminal current or the current of the electrical power received by the propulsion system means.

15. The electric trolling motor of claim 12, further comprising a display configured to provide an indication of the estimated travel speed.

16. The electric trolling motor of claim 12, wherein the estimated travel speed is utilized in a speed regulator to regulate the travel speed of the electric trolling motor.

17. The electric trolling motor of claim 12, further comprising a means for estimating the distance traveled utilizing the estimated travel speed.

18. The electric trolling motor of claim 12, wherein an energy storage means is used to supply the electrical power received by the said propulsion system means, and the electronic circuit is further configured to determine the remaining available stored energy in the energy storage means, the electronic circuit further configured to utilize the determined remaining available stored energy to also determine the remaining operation time at the estimated travel speed.

19. The electric trolling motor of claim 18, further comprising a means for estimating the remaining distance that can be traveled utilizing the estimated travel speed and the determined remaining available stored energy.

20. The electric trolling motor of claim 12, wherein speed estimation accuracy is improved via correction for varying propeller depth.

* * * * *